United States Patent
Okino et al.

(10) Patent No.: US 8,565,826 B2
(45) Date of Patent: Oct. 22, 2013

(54) RADIO COMMUNICATION DEVICE AND SIGNAL PROCESSING METHOD

(75) Inventors: Kenta Okino, Yokohama (JP); Takeshi Toda, Yokohama (JP); Chiharu Yamazaki, Yokohama (JP)

(73) Assignee: Kyocera Corporation, Kyoto (JP)

( * ) Notice: Subject to any disclaimer, the term of this patent is extended or adjusted under 35 U.S.C. 154(b) by 223 days.

(21) Appl. No.: 12/597,731

(22) PCT Filed: Apr. 25, 2008

(86) PCT No.: PCT/JP2008/058047
§ 371 (c)(1),
(2), (4) Date: Feb. 23, 2010

(87) PCT Pub. No.: WO2008/136399
PCT Pub. Date: Nov. 13, 2008

(65) Prior Publication Data
US 2010/0151798 A1    Jun. 17, 2010

(30) Foreign Application Priority Data
Apr. 26, 2007  (JP) ................. 2007-117789

(51) Int. Cl.
*H04M 1/00* (2006.01)
*H04B 1/06* (2006.01)

(52) U.S. Cl.
USPC ...................... 455/562.1; 455/272

(58) Field of Classification Search
USPC ............ 455/441, 562.1, 272–279.1, 10, 504; 343/824, 876, 893
See application file for complete search history.

(56) References Cited

U.S. PATENT DOCUMENTS

| | | | | |
|---|---|---|---|---|
| 5,819,168 A | * | 10/1998 | Golden et al. | 455/303 |
| 7,436,757 B1 | * | 10/2008 | Wilson et al. | 370/203 |
| 7,565,171 B2 | | 7/2009 | Doi et al. | 455/562.1 |
| 2002/0032015 A1 | * | 3/2002 | Kitakado et al. | 455/277.1 |
| 2002/0054621 A1 | * | 5/2002 | Kyeong et al. | 375/147 |
| 2003/0048857 A1 | * | 3/2003 | Onggosanusi et al. | 375/267 |
| 2004/0162021 A1 | | 8/2004 | Seki et al. | 455/39 |
| 2004/0176136 A1 | | 9/2004 | Doi et al. | 455/562.1 |
| 2005/0105647 A1 | * | 5/2005 | Wilhelmsson et al. | 375/316 |
| 2005/0118960 A1 | * | 6/2005 | Miyazaki | 455/67.11 |
| 2007/0030798 A1 | * | 2/2007 | Okada | 370/208 |

FOREIGN PATENT DOCUMENTS

| | | |
|---|---|---|
| JP | 2003-008675 | 1/2003 |
| JP | 2003-032167 | 1/2003 |
| JP | 2003198508 A | 7/2003 |
| WO | WO 02/091625 A1 | 11/2002 |
| WO | WO 2007/001052 A1 | 1/2007 |

OTHER PUBLICATIONS

Japanese language office action dated Jul. 21, 2011 and its English language translation for corresponding Japanese application 2007117789 cites the foreign patent document above.

* cited by examiner

*Primary Examiner* — Lester Kincaid
*Assistant Examiner* — Daniel Lai
(74) *Attorney, Agent, or Firm* — DLA Piper LLP (US)

(57) ABSTRACT

A radio base station 100 includes fading rate measurement units 103a to 103n configured to measure a fading rate of a radio signal for each of the antenna elements 101a to 101n, the radio signal being received through the antenna elements; and a reference signal calculator 105 configured to output a reference signal used in an adaptive control of the directivity of the array antenna 101. The reference signal calculator 105 outputs the reference signal on the basis of a plurality of fading rates measured by the fading rate measurement units 103a to 103n.

1 Claim, 3 Drawing Sheets

RADIO COMMUNICATION DEVICE AND SIGNAL PROCESSING METHOD

CROSS-REFERENCE TO THE RELATED APPLICATIONS

This application is a national stage of international application No. PCT/JP2008/058047, filed on Apr. 25, 2008, which also claims the benefit of priority under 35 USC 119 to Japanese Patent Application No. 2007-117789, filed Apr. 26, 2007, the entire contents of which are incorporated herein by reference.

TECHNICAL FIELD

The present invention relates to a radio communication device including an array antenna having multiple antenna elements and to a signal processing method used in the radio communication device.

BACKGROUND ART

Adaptive array control is implemented in a radio communication system, such as a mobile communication system, so that an increased number of radio communication terminals can be accommodated in the radio communication system, for example. In the adaptive array control, the directivity of an array antenna having multiple antenna elements is adaptively controlled by a radio communication device, such as a radio base station, according to the position of a radio communication terminal.

Meanwhile, in time division duplex (TDD) that allows received radio signals and transmission radio signals to be allocated to the site frequency band, a radio base station can use a reception weight, which is calculated based on a radio signal received from a radio communication terminal, as a transmission weight without making any corrections. However, if the reception weight is used as-is as the transmission weight while the radio communication terminal is moving at high speed (e.g., 100 km/h or faster), the following problem may arise. Specifically, a proper directivity in accordance with the position of the radio communication terminal cannot be obtained.

To avoid such problem, there is known a method in which the radio base station corrects the transmission weight by detecting a Doppler frequency, namely, a fading rate, that represents a movement speed of the radio communication terminal (for example, Patent Document 1).

Patent Document 1: JP-A 2003-32167 (pages 7 and 8, FIG. 1)

DISCLOSURE OF THE INVENTION

However, there is the following problem in the conventional is method in which the radio base station corrects the transmission weight based on a Doppler frequency, namely, a fading rate, of a radio signal received from the radio communication terminal through the array antenna.

Specifically, in the above method, the fading rate measured at each measuring time is a "momentary" fading rate at that measurement time. Accordingly, to improve the accuracy of measuring the fading rate representing a movement speed of the radio communication terminal, the fading rate has to be measured over a predetermined period of time, and the maximum value needs to be detected among the fading rates thus measured.

However, there is a case where enough time for measuring the fading rates cannot be secured, such as in the initial connection of a radio communication terminal to the radio base station.

The present invention has been made under such circumstances, and has an objective of providing a radio communication device and a signal processing method that allow further improvement in the accuracy of signal processing such as adaptive array control, while reducing the time for measuring the fading rate (Doppler frequency) of a radio signal received from a radio communication terminal, when the radio communication terminal is moving at high speed.

The present invention has the following characteristics to solve the problems described above. First of all, a first characteristic of the present invention is summarized as a radio is communication device (radio base station 100) including: an array antenna (array antenna 101) having a plurality of antenna elements (antenna elements 101a to 101n); and a signal processor (signal processor 107) configured to execute processing (adaptive control of directivity of array antenna 101, for example) on signals transmitted and received through the array antenna, the radio communication device comprising: a fading rate measurement unit (fading rate measurement units 103a to 103n) configured to measure a fading rate (fading rate fd) of a radio signal (radio signal S11 to S13) for each of the antenna elements, the radio signal being received through the antenna elements; and a reference signal output unit (reference signal calculator 105) configured to generate a reference signal (maximum fading rate $fd_{MAX}$, for example) used in the processing performed by the signal processor, wherein the reference signal output unit outputs the reference signal on the basis of a plurality of fading rates measured by the fading rate measurement unit.

According to the radio communication device thus configured, a fading rate of a radio signal received through each of the antenna elements is measured for each antenna element. Moreover, based on the multiple fading rates thus measured, the reference signal is outputted which is used for processing on signals transmitted and received through the array antenna (e.g., adaptive control of the directivity of the array antenna).

Accordingly, with a single fading-rate measurement, the fading rates which are as many as the number of antenna elements are measured. Therefore, even when enough time for measuring the fading rates cannot be secured, such as in the initial connection of a radio communication terminal to the radio base station (radio communication device), the accuracy of measuring the fading rate representing the movement speed of the radio communication terminal can be improved, while reducing the time for measuring the fading rate (Doppler frequency) of the received radio signal.

In sum, the radio communication device thus configured allows further improvement in the accuracy of the signal processing, while reducing the time for measuring the fading rate (Doppler frequency).

A second characteristic of the present invention is according to the first characteristic of the present invention and is summarized in that: as the reference signal, the reference signal output unit outputs one or more fading rates (maximum fading so rate $fd_{MAX}$, for example) belonging to a group of fading rates having values higher than a predetermined threshold, among the plurality of fading rates measured by the fading rate measurement unit.

A third characteristic of the present invention is according to the second characteristic of the present invention and is summarized in that: as the reference signal, the reference signal output unit outputs a fading rate (maximum fading rate $fd_{MAX}$, for example) having a highest value among the plurality of fading rates measured by the fading rate measurement unit.

A fourth characteristic of the present invention is according to the first characteristic of the present invention and is summarized in that: the reference signal output unit determines a degree (fading rate variance $fd_{VAR}$) of dispersion among the plurality of fading rates measured by the fading rate measurement unit, and outputs the reference signal on the basis of the degree of dispersion thus determined.

A fifth characteristic of the present invention is according to the first characteristic of the present invention and is summarized in that: the radio communication device further comprising an antenna correlation determination unit (antenna correlation determination unit 109) configured to determine a correlation of the radio signal among the antenna elements, wherein the reference signal output unit outputs the reference signal on the basis of the plurality of fading rates measured by the fading rate measurement unit and of the correlation determined by the antenna correlation determination unit.

A sixth characteristic of the present invention is according to the fifth characteristic of the present invention and is summarized in that: in executing the processing using the reference signal outputted from the reference signal output unit, the signal processor executes the processing on a certain transmission-source radio communication device (radio communication terminal 200A) preferentially over other transmission-source radio communication devices, the certain radio communication terminal having transmitted the radio signal whose fading rate measured by the fading rate measurement unit and whose correlation determined by the antenna correlation determination unit show values higher than respective predetermined thresholds.

A seventh characteristic of the present invention is summarized as a signal processing method used in a radio communication device including an array antenna having a plurality of antenna elements, the signal processing method comprising the steps of: measuring a fading rate of a radio signal for each of the antenna elements, the radio signal being received through the antenna elements; outputting a reference signal, used in processing on signals transmitted and received through the array antenna; and executing the processing using the reference signal, wherein in the step of outputting the reference signal, the reference signal is generated based on a plurality of the measured fading rates.

According to the aspects of the present invention, the present invention can provide a radio communication device and a signal processing method that allow further improvement in the so accuracy of signal processing such as adaptive array control, while reducing the time for measuring the fading rate (Doppler frequency) of a radio signal received from a radio communication terminal, when the radio communication terminal is moving at high speed.

BEST MODES FOR CARRYING OUT THE INVENTION

Figure 1:
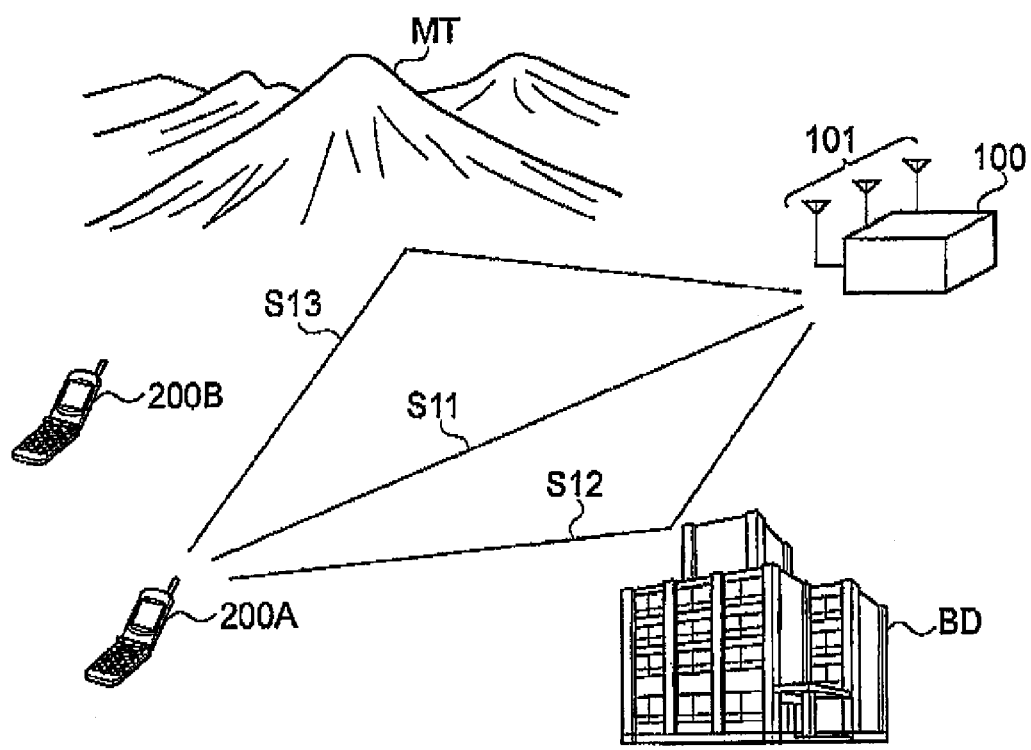
FIG. 1 is an overall schematic configuration diagram of a radio communication system according to an embodiment of the present invention.

Next, an embodiment of the present invention is described. Specifically, descriptions are given for (1) an overall schematic configuration of a radio communication system, (2) a functional block configuration of a radio communication device, (3) a function of a reference signal output unit, (4) an operation of the radio communication device, (5) advantageous effects, and (6) other embodiments.

Note that, throughout the drawings, the same or like parts bear the same or like reference numerals. It should be noted, however, that the drawings are schematic, and that the dimensional proportions and the like are different from their actual values.

Accordingly, specific dimensions and the like should be inferred based on the description given below. Moreover, dimensional relationships and proportions may differ from one drawing to another in some parts, of course.

(1) Overall Schematic Configuration of Radio Communication System

FIG. 1 is an overall schematic configuration diagram of a radio communication system according to the present embodiment. As FIG. 1 shows, the radio communication system according to the present embodiment includes a radio base station 100 and radio communication terminals 200A, 200B. Note that the numbers of radio base stations and radio communication terminals included in the radio communication system are not limited to the numbers shown in FIG. 1.

The radio communication system according to the present embodiment is in conformity with iBurst (registered trademark) using the TDMA-TDD scheme. In addition, the radio communication system employs the Space-Division Multiple Access scheme (SDMA) which uses radio signals of the same frequency band at the same time to thereby increase the number of radio communication terminals that can be accommodated in the radio communication system.

Specifically, the radio communication system employs adaptive array control to implement SDMA. In the adaptive array Control, the directivity of an array antenna 101 included in the radio base station 100 is controlled adaptively according to the position of a radio communication terminal.

The radio base station 100 includes the array antenna 101 having multiple antenna elements. The radio base station 100 receives radio signals 511 to 513 transmitted by the radio communication terminal 200A. In addition, the radio base station 100 transmits a radio signal (not shown) to the radio communication terminal 200A (200B).

The radio communication terminals 200A, 200E are portable, small-size radio communication terminals. Accordingly, the radio communication terminals 200A, 200B move with the respective users. When the user of the radio communication terminal 200A is on a train for example, the radio communication terminal 200A moves at high speed.

Meanwhile, a mountainous area MT and a building BD exist between the radio base station 100 and the radio communication terminal 200A. For this reason, a radio signal transmitted by the radio communication terminal 200A reaches the radio base station 100 as the radio signal S11 that propagates to the radio base station 100 directly, the radio signal S12 that propagates to the radio base station 100 after being reflected by the building BD, and the radio signal S13 that propagates to the radio base station 100 after being reflected by the mountainous area MT. In other words, the radio signal takes multi-paths.

(2) Functional Block Configuration of Radio Communication Device

Figure 2:
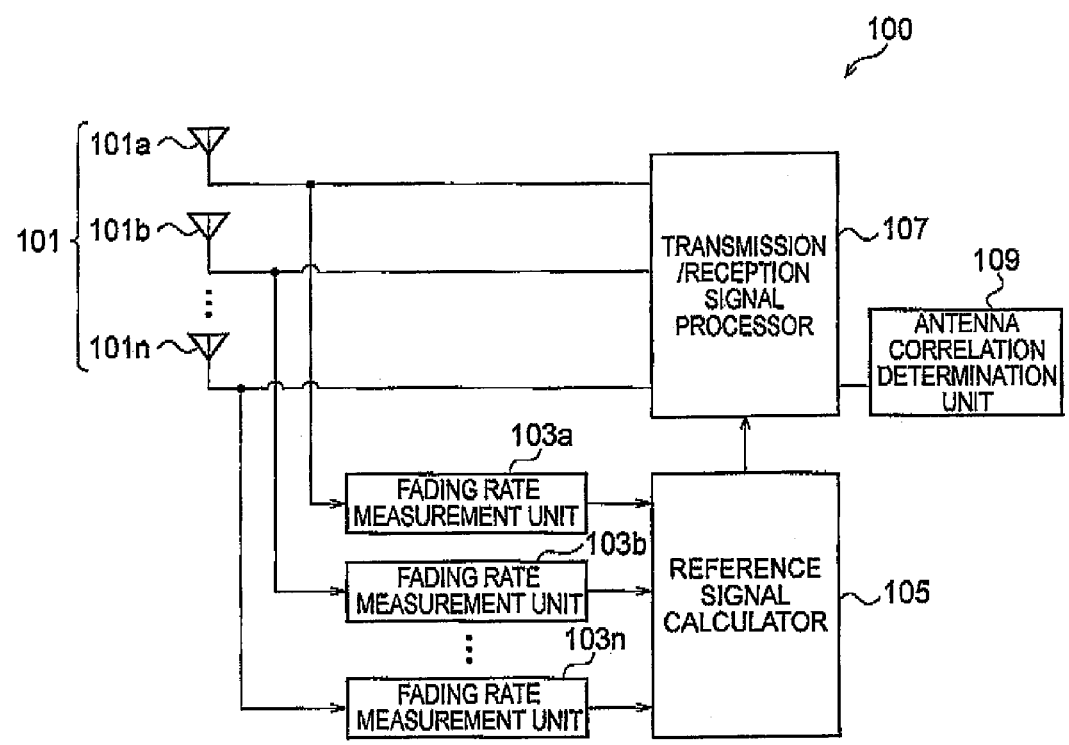
FIG. 2 is a functional block diagram of a radio communication device according to the embodiment of the present invention.

FIG. 2 is a diagram showing a functional block of the radio base station 100 that constitutes a radio communication device in the present embodiment. As FIG. 2 shows, the radio base station 100 includes the array antenna 101, fading rate measurement units 103a to 103n, a reference signal calculator 105, a signal processor 107, and an antenna correlation determination unit 109.

The array antenna 101 includes multiple antenna elements, specifically, antenna elements 101a to 101n. The antenna element 101a, is connected to the fading rate measurement unit 103a. Likewise, the antenna elements 101b to 101n are connected to the fading rate measurement units 103b to 103n, respectively. The antenna elements 101a to 101n are also connected to the signal processor 107.

The fading rate measurement unit 103a measures a fading rate fd, or more specifically, a Doppler frequency, of the radio signals S11 to S13 received through the antenna element 101a. Likewise, each of the fading rate measurement units 103b to 103n measures the fading rate fd of the radio signals S11 to S13 received through a corresponding one of the antenna elements 101b to 101n.

In other words, for each of the antenna elements 101a to 101n, a corresponding one of the fading rate measurement units 103a to 103n measures the fading rate fd of the radio signals S11 to S13 received through the antenna elements. The fading rate measurement unit 103a is taken as an example in the description below.

In the present embodiment, a known signal is inserted into a radio signal transmitted by the radio communication terminal 200A (200B). The radio base station 100 knows the phase and amplitude values of the known signal.

As described in JF-A7-162360 for example, based on the known signal included in the radio signals S11 to S13, the fading rate measurement unit 103a calculates an estimation value indicating the propagation-path states of the radio signals S11 to S13. The fading rate measurement unit 103a calculates the estimation value periodically, and measures the fading rate fd on the basis of a difference between the estimation value previously calculated and the estimation value newly calculated.

Here, the fading rate fd measured through the n-th antenna element in the m-th frame (or slot) satisfies (Expression 1).

[Formula 1]

$$fd(n,m) \geq 0 \qquad \text{(Expression 1)}$$

The reference signal calculator 105 outputs a reference signal which is used by the signal processor 107 for adaptive control of the directivity of the array antenna 101. In the present embodiment, the reference signal calculator 105 constitutes a reference signal output unit.

Specifically, the reference signal calculator 105 outputs a reference signal on the basis of the multiple fading rates fd measured by the fading rate measurement units 103a to 103n. Note that more specific functions of the reference signal calculator 105 will be described later.

The signal processor 107 executes processing on a radio signal received from the radio communication terminal 200A (200B) through the array antenna 101, and on a radio signal to be transmitted to the radio communication terminal 200A (200B) through the array antenna 101.

Specifically, the signal processor 107 executes processing for digital modulation and demodulation, adaptive control for the directivity of the array antenna 101, channel allocation, and the is like.

The signal processor 107 uses the reference signal outputted from the reference signal calculator 105 to execute adaptive control for the directivity of the array antenna 101, namely, adaptive array control.

Further, in the present embodiment, when a certain radio communication terminal has transmitted a radio signal whose fading rate fd measured by the fading rate measurement units 103a to 103n and whose antenna correlation C (see FIG. 4) determined by the antenna correlation determination unit 109 show values higher than respective predetermined thresholds, the signal processor 107 executes control such that the certain radio communication terminal (transmission-source radio communication device) is treated differently from other radio communication terminals (other transmission-source radio communication devices).

Figure 4:
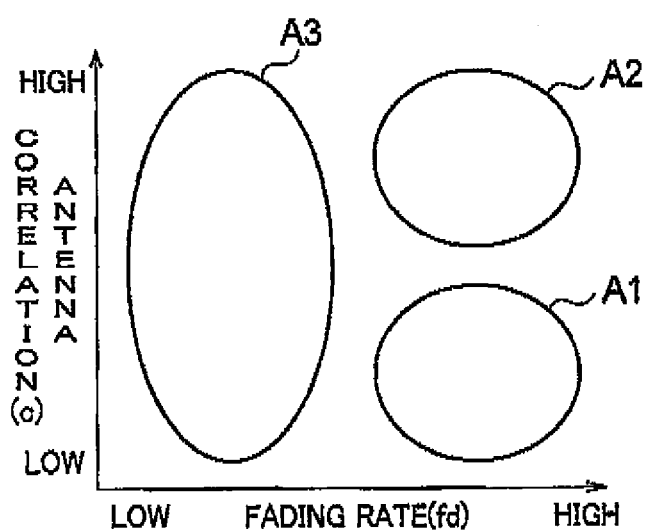
FIG. 4 shows a relationship between an antenna correlation and a fading rate of a radio signal received by the radio communication device according to the embodiment of the present invention.

Specifically, the signal processor 107 executes the adaptive array control on a certain radio communication terminal (e.g., radio communication terminal 200A) preferentially over other radio communication terminals (e.g., radio communication terminal 200B), the certain radio communication terminal transmitting a radio signal whose antenna correlation C and fading rate fd are in Area A2 (see FIG. 4). In other words, the signal processor 107 applies space multiplexing on the certain radio communication terminal preferentially over other radio communication terminals.

Moreover, in executing processing (adaptive array control) using the reference signal outputted from the reference signal calculator 105, the signal processor 107 may execute the processing on a certain radio communication terminal preferentially over other radio communication terminals, the certain radio communication terminal having transmitted a radio signal whose fading rate fd measured by the fading rate measurement units 103a to 103n and whose antenna correlation C determined by the antenna correlation determination unit 109 show values higher than the predetermined thresholds.

The antenna correlation determination unit 109 determines a correlation of radio signals among the antenna elements 101a to 101n (antenna correlation C). Specifically, the antenna correlation determination unit 109 determines the degree of correlation of radio signals among the antenna elements 101a to 101n, based on the states (such as the amplitudes and phases) of radio signals received by the respective antenna elements 101a to 101n.

(3) Functions of Reference Signal Output Unit

Next, a description is given of functions of the reference signal calculator 105 that constitutes a reference signal output unit in the present embodiment. In the present embodiment, the reference signal calculator 105 is capable of outputting two types of reference signals, specifically, a maximum fading rate $fd_{MAX}$ and a fading rate variance $fd_{VAR}$.

(3.1) Maximum Fading Rate $fd_{MAX}$

As the reference signal, the reference signal calculator 105 outputs, to the signal processor 107, the maximum fading rate $fd_{MAX}$ having the highest value among the multiple fading rates fd measured by the fading rate measurement units 103a to 103n.

Specifically, as the maximum fading rate $fd_{MAX}$, the reference signal calculator 105 selects a fading rate fd having the highest value among the fading rates fd, which are as many as the number obtained by multiplexing the number of antenna elements (N) and the number of measured frames (slots).

Here, FIG. 4 shows a relationship between the fading rate fd (more specifically, the maximum fading rate $fd_{MAX}$) of radio signals received by the radio base station 100 through the array antenna 101, and the antenna correlation C.

When the maximum fading rate $fd_{MAX}$ is in Area A1 and Area A2 shown in FIG. 4, in other words, when the maximum fading rate $fd_{MAX}$ is higher than the predetermined threshold, the signal processor 107 having acquired the maximum fading rate $fd_{MAX}$ as the reference signal can execute control that contributes to a decrease in the maximum fading rate $fd_{MAX}$ of the radio communication terminal that has transmitted that radio signal, such as allocating a radio signal using a low-frequency band.

Note that, as the reference signal, the reference signal calculator 105 may output one or more fading rates fd to the signal processor 107. Specifically, among the multiple fading rates fd measured by the fading rate measurement units 103a to 103n, the reference signal calculator 105 may output one or more fading rates fd that belong to a group of the fading rates fd having values higher than the predetermined threshold.

For example, as the reference signal, the reference signal calculator 105 may output the fading rate fd included in Area A1 or Area A2 shown in FIG. 4 to the signal processor 107. In other words, the reference signal calculator 105 may output the reference signal on the basis of the multiple fading rates fd measured by the fading rate measurement units 103a to 103n and of the antenna correlation C determined by the antenna correlation determination unit 109.

(3.2) Fading Rate variance $fd_{VAR}$

The reference signal calculator 105 determines the degree of dispersion among the multiple fading rates fd measured by the fading rate measurement units 103a to 103n, and outputs the reference signal on the basis of the degree of dispersion thus determined.

In the present embodiment, the reference signal calculator 105 calculates the variance of the fading rate fd on the basis of the multiple fading rates fd measured by the fading rate measurement units 103a to 103n.

Specifically, the reference signal calculator 105 calculates a fading rate average $fd_{AVE}$ based on (Expression 2).

[Formula 2]

$$fd_{AVE} = \frac{1}{NM} \sum_{n=0}^{N-1} \sum_{m=0}^{M-1} fd(n, m) \quad \text{(Expression 2)}$$

Further, using the fading rate average $fd_{AVE}$ thus calculated, the reference signal calculator 105 calculates a fading rate variance $fd_{VAR}$, based on (Expression 3).

[Formula 3]

$$fd_{VAR} = \frac{1}{NM} \sum_{n=0}^{N-1} \sum_{m=0}^{M-1} (fd(n, m) - fd_{AVE}(m))^2 \quad \text{(Expression 3)}$$

By calculating the fading rate variance $fd_{VAR}$, the reference signal calculator 105 can further determine which of the areas shown in FIG. 4 the fading rate fd is in, Area A1 or Area A2.

Specifically, when the fading rate variance $fd_{VAR}$ is large, it can be determined that the antenna correlation C is small. Accordingly, it is determined that the fading rate fd of the radio signal is in Area A1. On the other hand, when the fading rate variance $fd_{VAR}$ is small, it can be determined that the antenna correlation C is large. Accordingly, it is determined that the fading rate fd of the radio signal is in Area A2.

As described above, in the preset embodiment, the signal processor 107 preferentially executes adaptive array control on the radio communication terminal transmitting a radio signal whose antenna correlation C and fading rate fd are in Area A2.

Note that, instead of the fading rate variance $fd_{VAR}$, the to reference signal calculator 105 may calculate a difference between the fading rates fd (e.g., a difference between the maximum fading rate $fd_{MAX}$ and the minimum fading rate), and output the calculated difference to the signal processor 107 as the reference signal.

(4) Operation of Radio Communication Device

Figure 3:
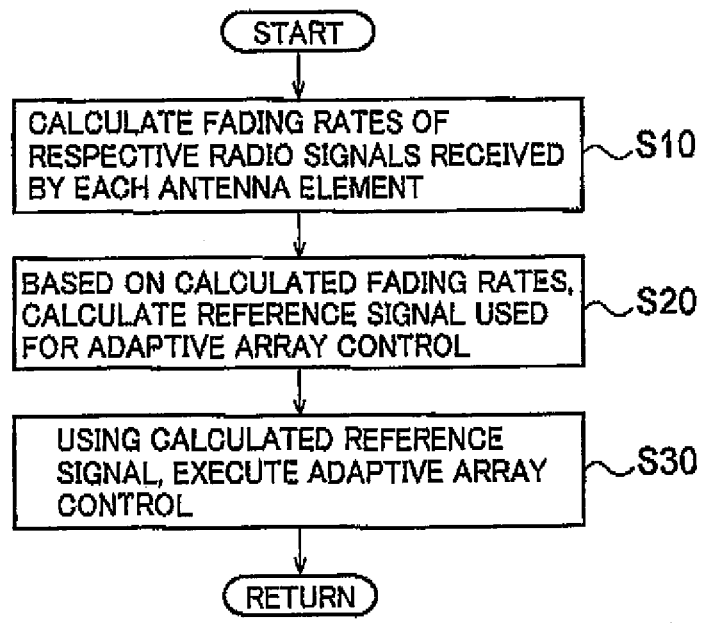
FIG. 3 shows an operation flow of the radio communication device according to the embodiment of the present invention.

FIG. 3 shows an operation flow of the radio base station 100 constituting the radio communication device in the present embodiment. Specifically, FIG. 3 shows an operation flow of adaptive array control executed by the radio base station 100.

As FIG. 3 shows, in Step 510, the radio base station 100 Calculates the fading rates fd of the respective radio signals S11 to S13 received by each of the antenna elements.

In Step 520, based on the calculated fading rates fd, the radio base station 100 calculates a reference signal used for the adaptive array control. Specifically, as described above, the radio base station 100 calculates either the maximum fading rates $fd_{MAX}$ or the fading rate variance $fd_{VAR}$, of the radio signals.

In Step 530, using the calculated reference signal, the radio base station 100 executes adaptive control of the directivity of the array antenna 101, namely, the adaptive array control.

(5) Advantageous Effects

According to the radio base station 100, the fading rate fd of the radio signals S11 to S13 received through an antenna element is measured for each of the antenna elements 101a to 101n.

Then, based on the multiple fading rates fd thus measured, a reference signal, which is used for adaptive control of the directivity of the array antenna 101, is outputted.

Accordingly, with a single fading-rate-fd measurement, the fading rates fd which are as many as the number of antenna elements are measured. Therefore, even when enough time for measuring the fading rates fd cannot be secured, such as in the initial connection of a radio communication terminal (e.g., radio communication terminal 200A) to the radio base station 100, the accuracy of measuring the fading rate fd which represents the movement speed of the radio communication terminal 200A can be improved, while reducing the time for measuring the fading rates fd (Doppler frequencies) of the received radio signals S11 to S13.

In sum, the radio base station 100 allows further improvement in the accuracy of the adaptive array control, while reducing the time for measuring the fading rates fd (Doppler frequencies).

In the present embodiment, either the maximum fading rate $fd_{MAX}$ or the fading rate variance fd is used as a reference signal used for the adaptive control of the directivity of the array antenna 101. When the fading rate variance $fd_{VAR}$ is used as the reference signal, it is possible to carry out more precise control, based on the antenna correlation C. Specifically, it is possible to preferentially execute adaptive array on a radio communication terminal transmitting a radio signal having a high antenna correlation C. Accordingly, even when the movement speed of a radio communication terminal is high, if the antenna correlation C is high, namely, if there is little influence by multi-paths, active application of spatial multiplexing allows an increased number of radio communication terminals to be accommodated in the radio communication system.

(6) Other Embodiments

The contents of the present invention have been disclosed as above using the embodiment of the present invention. However, it should be understood that the descriptions and drawings constituting a part of the disclosure do not limit the present invention. This disclosure will make various alternative embodiments apparent to those skilled in the art.

For example, in the above embodiment, adaptive array control is executed preferentially on a radio communication terminal transmitting a radio signal having a high antenna correlation C, but a modification may be made as follows. Specifically, the calculation method for a transmission weight, which is used in the adaptive array control, may be changed for the radio communication terminal transmitting a radio signal having a high antenna correlation C. For example, consider a case where a reception weight is not being used as a transmission weight as-is, and is being corrected to be used as the transmission weight. If it is then, that the antenna correlation C is high, the correction of the transmission weight may be stopped to use the reception weight as the transmission weight as-is for the radio communication terminal transmitting the radio signal.

As described, the present invention naturally includes various embodiments and the like that are not described herein. Therefore, the technical scope of the present invention should be defined only by the features defining the invention according to the scope of claims reasonably understood from the above description.

Note that the entire content of Japanese Patent Application No. 2007-117789 (filed on Apr. 26, 2007) is incorporated herein by reference.

INDUSTRIAL APPLICABILITY

As described above, the radio communication device and the signal processing method according to the present invention are useful in radio communications such as mobile communications because, when a radio communication terminal moves at high speed, they allow further improvement in the accuracy of signal processing such as adaptive array control, while reducing the time for measuring the fading rate (Doppler frequency) of a radio signal received from the radio communication terminal.

The invention claimed is:

1. A signal processing method used in a radio communication device comprising an array antenna having a plurality of antenna elements, the signal processing method comprising the steps of:
    measuring a fading rate of a radio signal for each of the antenna elements, the radio signal being received through the antenna elements;
    outputting a reference signal used in processing on signals transmitted and received through the array antenna;
    executing the processing using the reference signal, wherein in the step of outputting the reference signal, the reference signal is generated based on a plurality of the measured fading rates; and
    determining a correlation of the radio signal among the antenna elements, wherein
    in the step of outputting the reference signal, the reference signal is outputted on the basis of the plurality of measured fading rates and of the correlation of the radio signal among the antenna elements, and
    in executing the processing using the outputted reference signal, processing on a certain transmission-source radio communication device is preferentially executed over other transmission-source radio communication devices, the certain transmission-source radio communication device having transmitted the radio signal whose measured fading rate and whose determined correlation show values higher than respective predetermined thresholds.

* * * * *